May 26, 1936.  F. A. KAISER  2,042,342
CALCULATING MACHINE
Filed Sept. 9, 1929  6 Sheets-Sheet 1
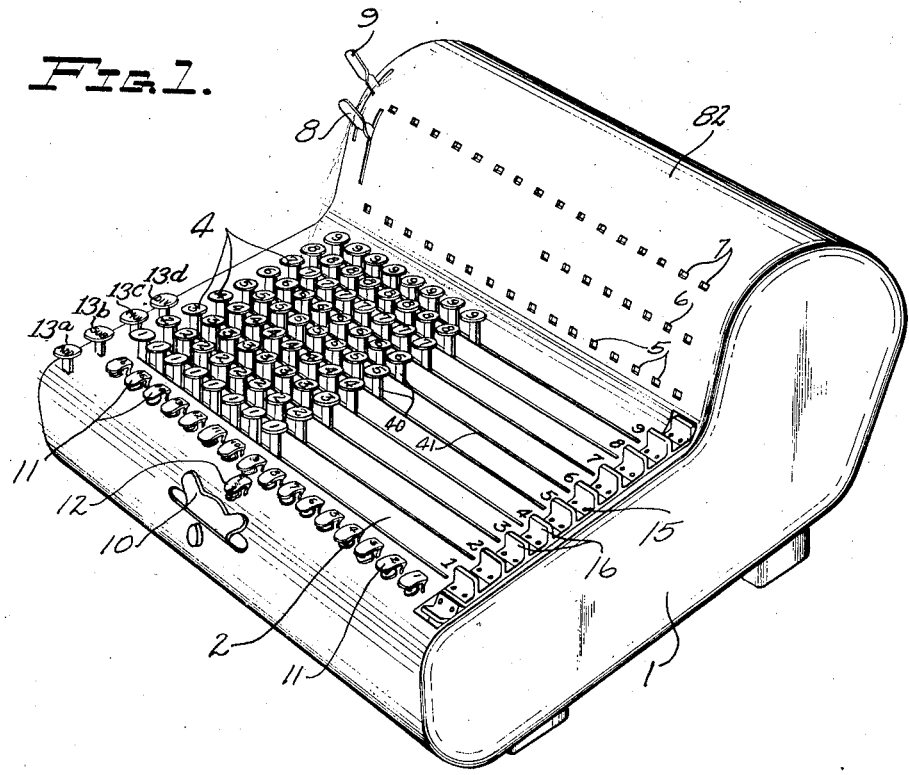
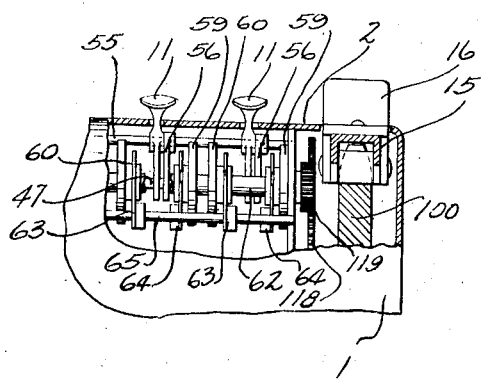
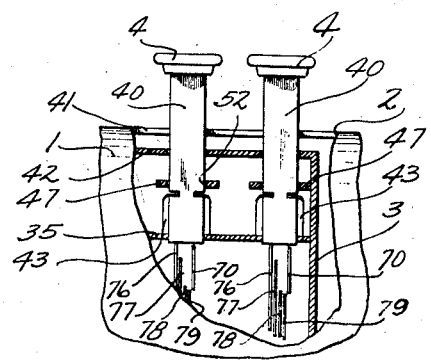
INVENTOR.
Frank A. Kaiser
BY Wheeler, Wheeler & Wheeler
ATTORNEYS May 26, 1936.     F. A. KAISER     2,042,342
CALCULATING MACHINE
Filed Sept. 9, 1929     6 Sheets-Sheet 2

INVENTOR.
Frank A. Kaiser
BY
Wheeler, Wheeler & Wheeler
ATTORNEYS

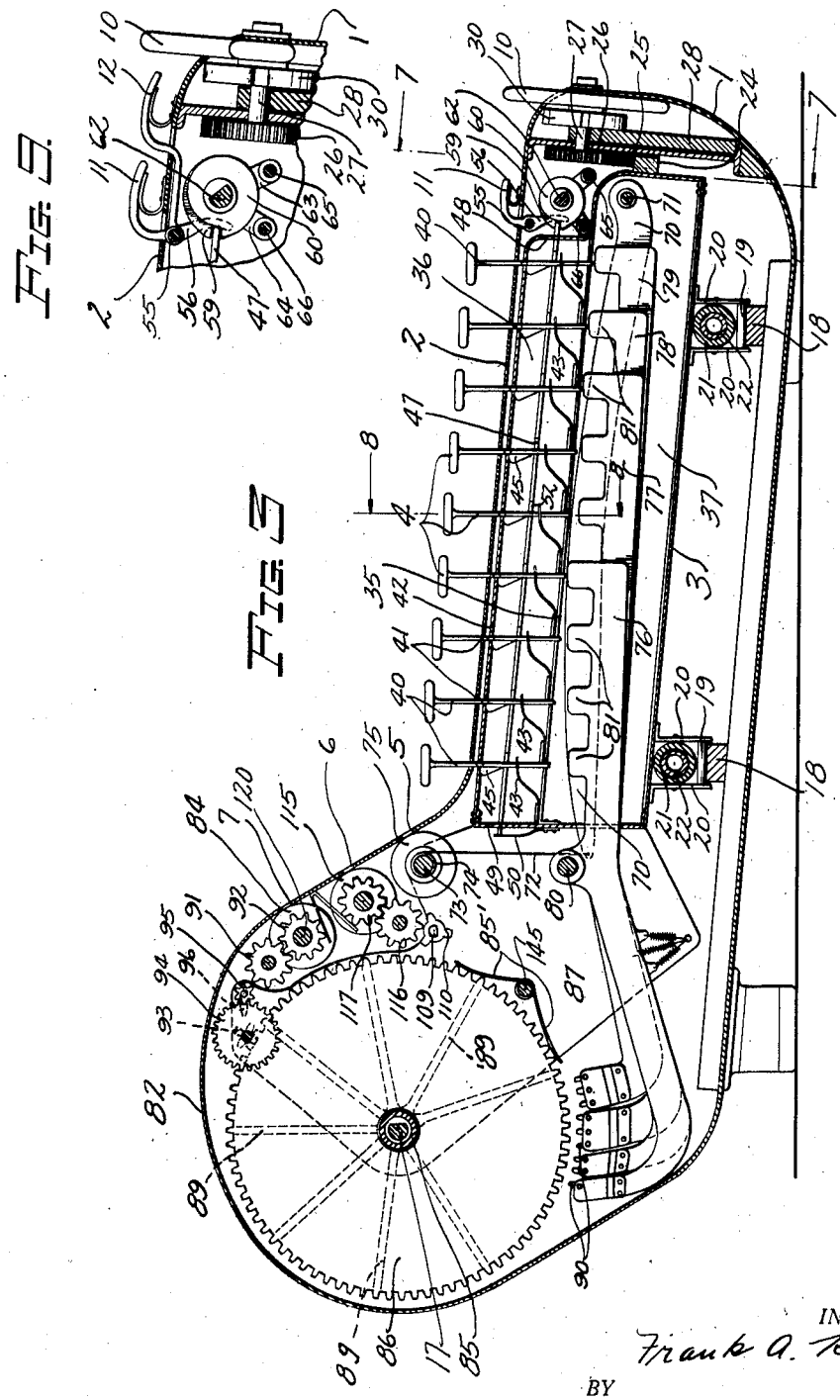

May 26, 1936.　　F. A. KAISER　　2,042,342
CALCULATING MACHINE
Filed Sept. 9, 1929　　6 Sheets-Sheet 4
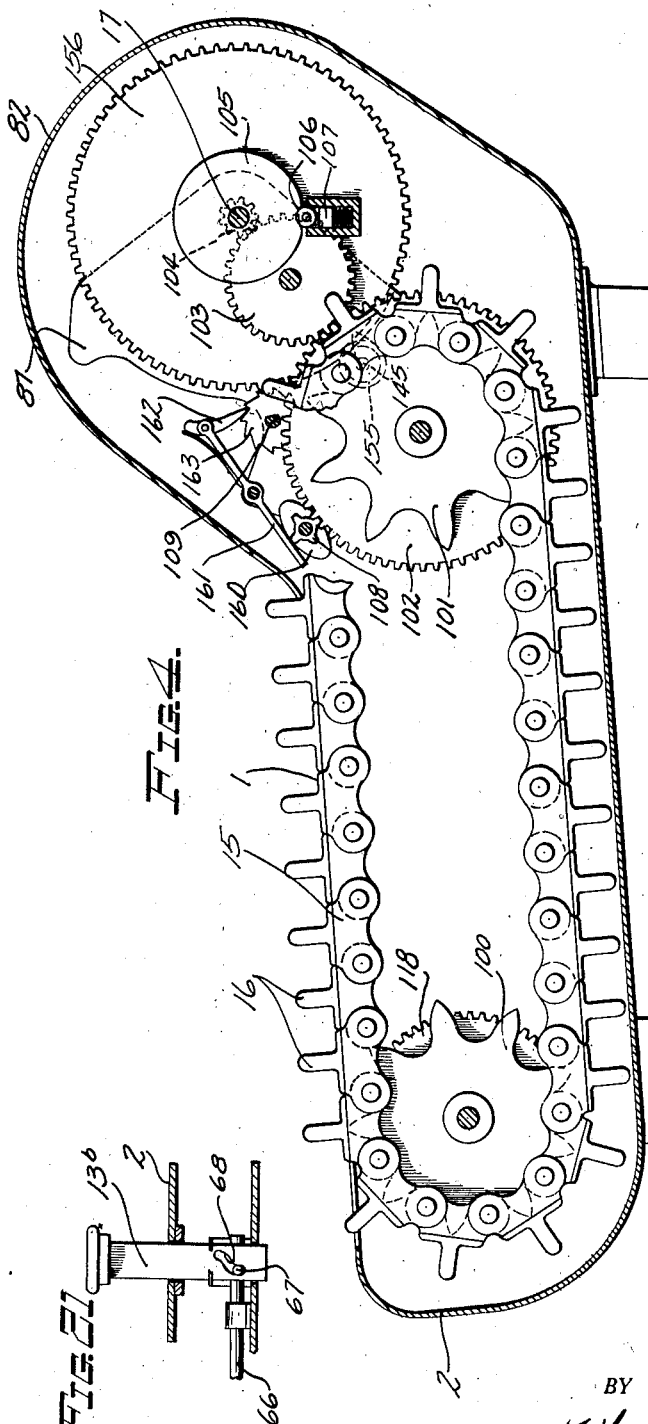
INVENTOR.
Frank A. Kaiser
BY
Wheeler, Wheeler & Wheeler
ATTORNEYS

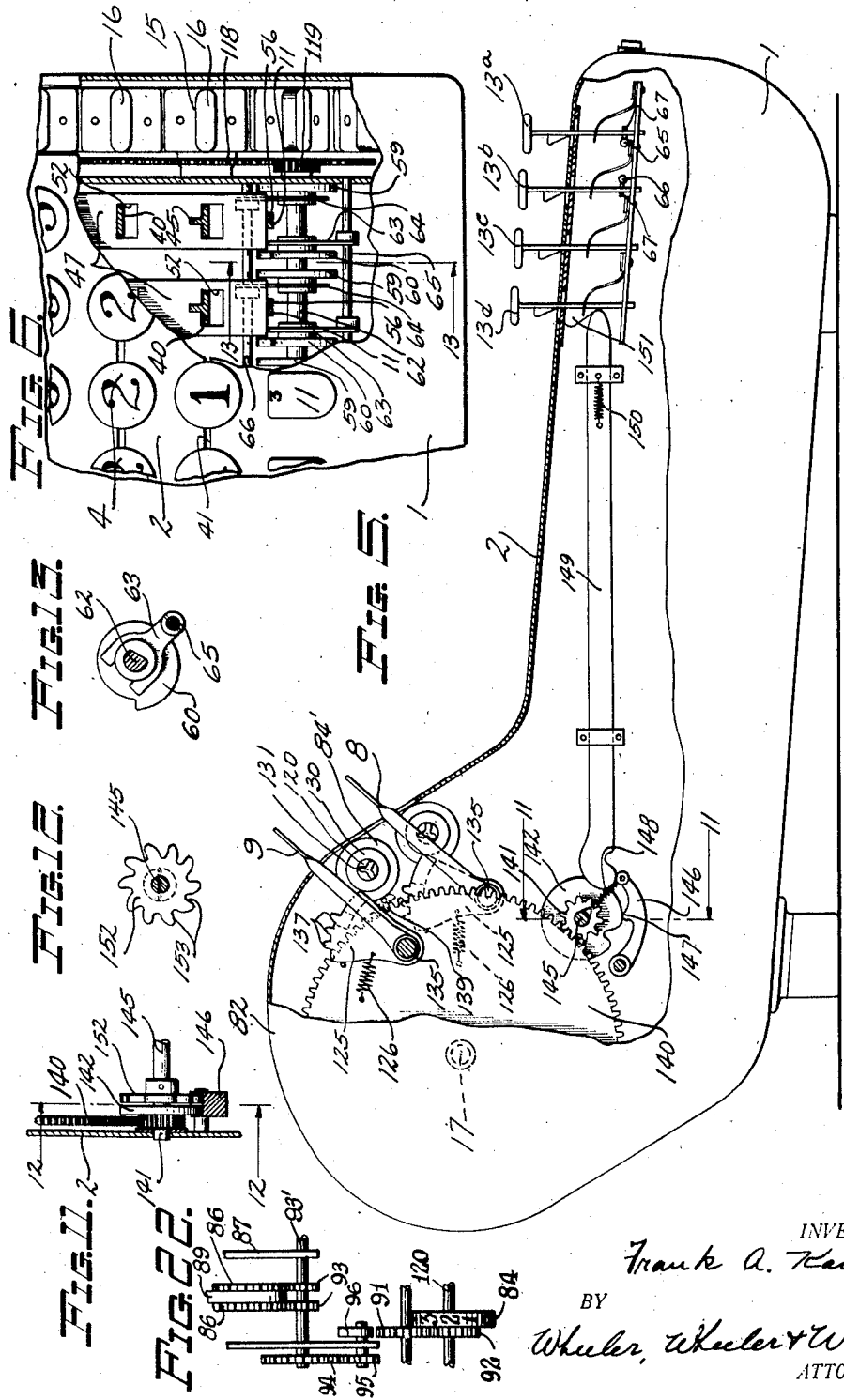

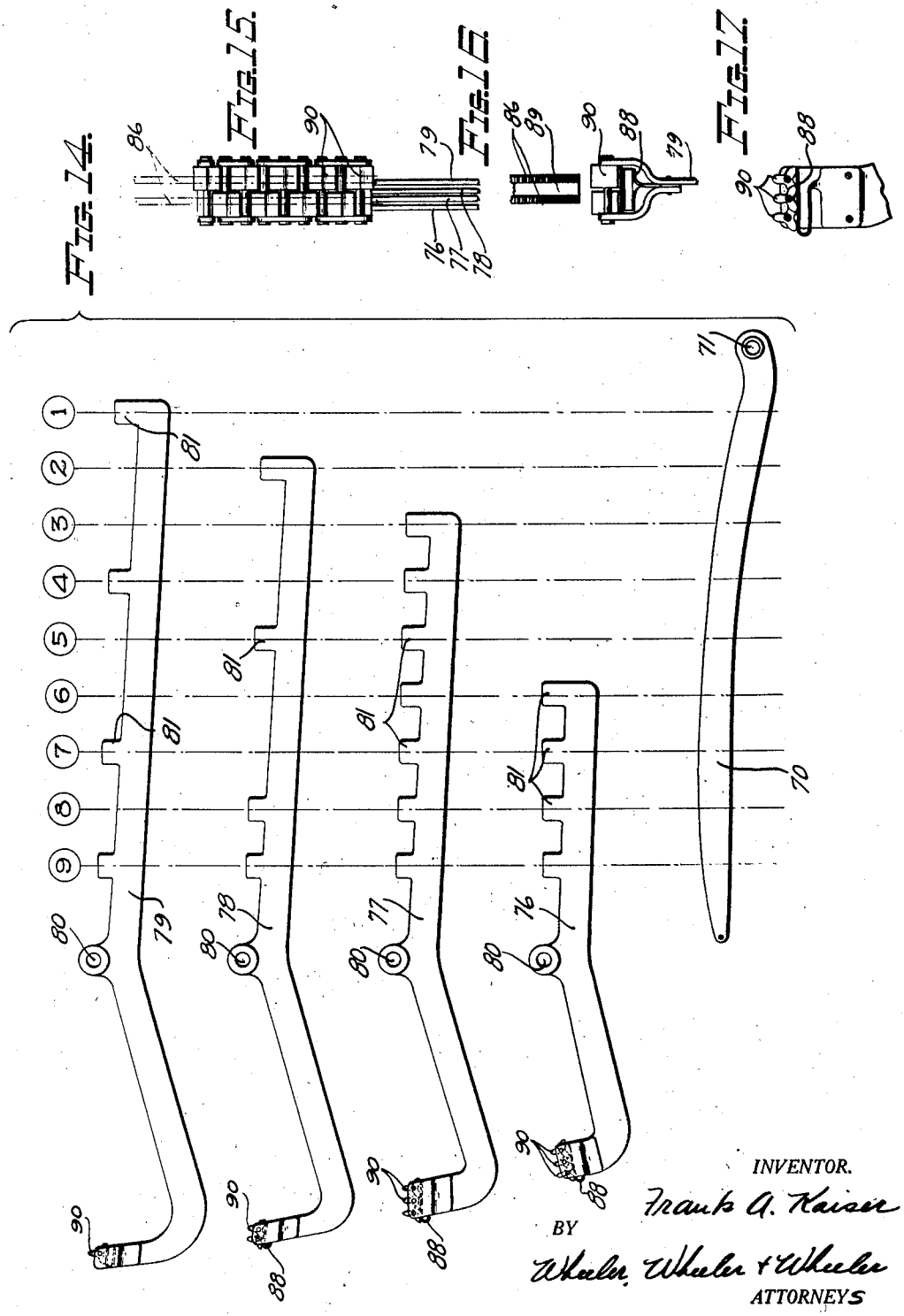

Patented May 26, 1936

2,042,342

UNITED STATES PATENT OFFICE 2,042,342

CALCULATING MACHINE

Frank A. Kaiser, Milwaukee, Wis.

Application September 9, 1929, Serial No. 391,289

30 Claims. (Cl. 235—82)

This invention relates to improvements in calculating machines.

It is the primary object of the invention to provide a calculating machine which may be operated manually with approximately the same facility as an electrically operated machine, not to mention other manually operated machines, and with a material increase in speed of certain operations over the speed which is possible with an electrically operated device, while at the same time providing a machine which is silent in operation, light in weight, relatively inexpensive and has a simple mechanism for performing any desired problem in calculation.

More specifically stated, it is my purpose to provide a machine having three sets of dials upon which all numbers concerned in the problem are legible at all times; to provide a machine in which the interaction of the parts is facilitated by mounting the set-up and transmission mechanism upon a carriage which is reciprocable in a transverse path before certain relatively stationary registering dials; to provide a novel and improved and extremely simple means for transferring numbers set up in the keys of the machine to the proper dials; and to provide a novel, improved means for manually imparting the required degree of motion to the transmission mechanism for controlling the effect of the number set up on the keyboard upon the dials.

Other objects of the invention relate to more detailed structure of the device including particularly the carriage operating means, the automatically operable clearing device for the keyboard which is used in addition and subtraction, the specific transmission mechanism, the specific control mechanism, and the automatically operable detent structure used in division. These and other details of construction will be described in the following specification from which their advantages and purposes will be more fully apparent.

In the drawings:

Figure 1 is a perspective view of the complete machine with the shiftable keyboard in extreme left hand position.

Figure 3 is a longitudinal section through the machine on a slightly larger scale than Fig. 2.

Figure 4 is a side elevation of the actuating mechanism and associated parts, the case being shown in section to expose such mechanism.

Figure 5 is a side elevation of the opposite end of the machine from that illustrated in Fig. 4, portions of the case being broken away to expose clearing device, automatic stop and control keys.

Figure 6 is an enlarged detailed view in plan of the right hand corner of the machine, a portion of the casing being broken away to expose automatically operable keyboard clearing means.

Figure 7 (Sheet 1) is a detail in front elevation of the keyboard clearing means exposed in Fig. 6, the casing being shown in section in a plane indicated at 7—7 in Fig. 3.

Figure 8 is a detail view in front elevation of two keys of the carriage and associated parts, portions of the casing and carriage being broken away in the plane indicated at 8—8 in Fig. 3.

Figure 9 (Sheet 3) is taken in a plane through the casing exposing the master clearance key and carriage adjusting means, which are illustrated in side elevation.

Figure 11 (Sheet 5) is a detailed view taken in section in the plane indicated at 11—11 in Fig. 5.

Figure 12 is a detailed view taken in the plane indicated at 12—12 in Fig. 11.

Figure 13 is a view in side elevation of one of the clearance cams and the means for shifting it, the casing being broken to a section taken at 13—13 in Fig. 6.

Figure 14 is a diagrammatic view of the several levers acted upon by the keys of each column indicating the relation of such levers to each other and to the keys of the column.

Figure 15 is a plan view of the set of pinions carried by the ends of the respective levers in their properly assembled relation.

Figure 16 is a fragmentary detail in front elevation of the gear pair and single toothed mutilated gear arranged for interaction with pinions shown in Fig. 15.

Figure 17 is a fragmentary detail in longitudinal section through the pinion mounting on the end of one of the levers.

Figure 18 (Sheet 4) is a fragmentary detail in plan on an enlarged scale showing portions of the clearing device illustrated in Fig. 5 and Fig. 2.

Figure 19 is a further detail in axial section along dial supports and portions of the clearing mechanism.

Figure 20 is a detail in transverse section through a portion of the casing containing the drive shaft 17 and the yieldable detent therefor as illustrated in Fig. 4.

Figure 21 is a detail view of the subtraction key showing the shifting means.

Figure 22 is a detail view on an enlarged scale showing the gear train through which motion is transmitted from gears 86 to a register dial.

Like parts are identified by the same reference characters throughout the several views.

Figure 2:
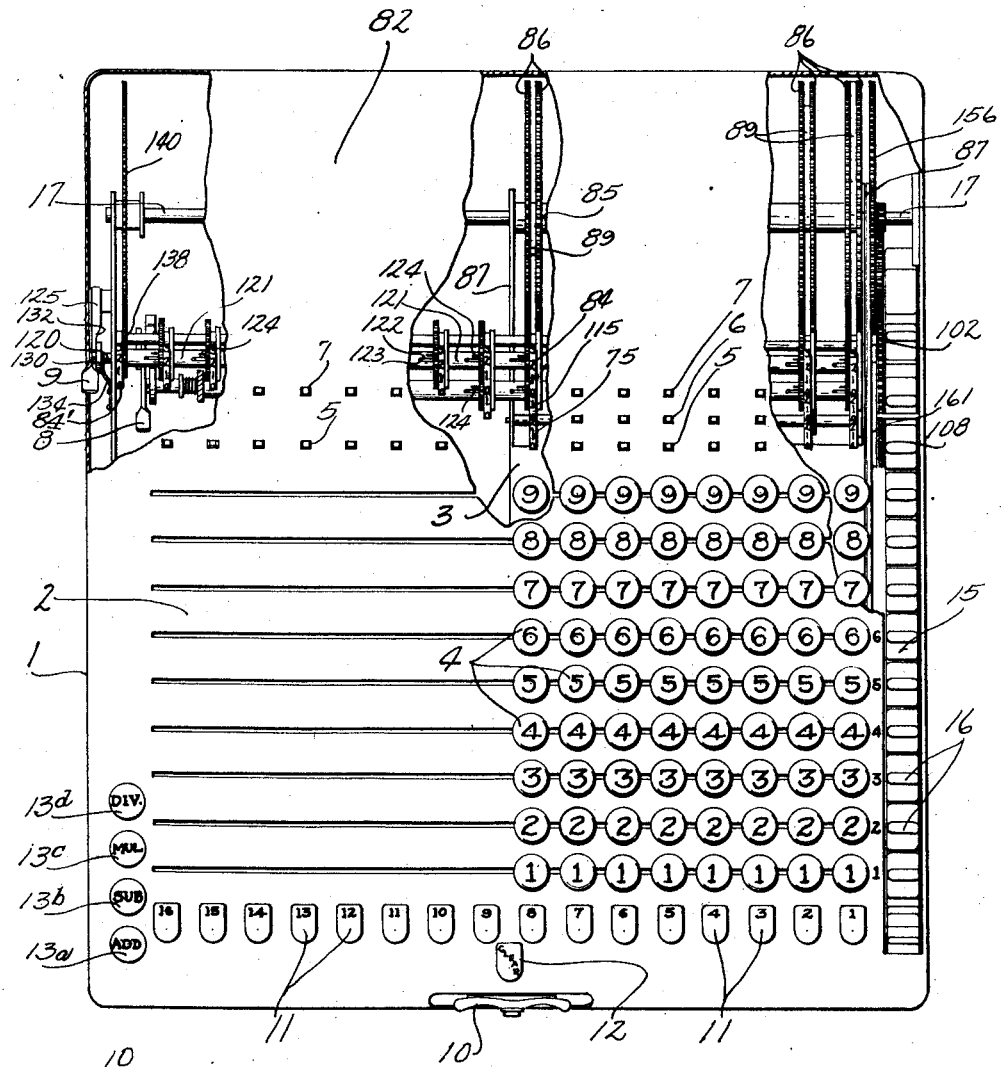
Figure 2 is a plan view of the machine on a larger scale showing the keyboard in extreme right hand position, portions of the casing being broken away to expose the interior mechanism.

Before describing the structure of my improved machine in detail, I shall make a brief general statement which will serve as a basis for correlating descriptions of the various sub-assemblies involved in the device. In this introductory statement the operation of the machine will be referred to only briefly and for the purpose of enabling the sub-assembly structures to be studied from the standpoint of known results to be accomplished. A more complete description of the operation of the machine will be given following the detailed analysis of its component parts.

*Introduction.*—The case 1 has a slotted face plate 2 which houses a transversely slidable carriage 3 upon which the entire keyboard, consisting of keys 4, is mounted for bodily lateral movement. In the particular machine illustrated, the keyboard consists of eight columns of keys, each column containing keys marked from 1 to 9 inclusive. A greater or less number of columns may be provided as desired. The particular transmission mechanism illustrated will also serve for any machine having fewer than eight columns. A greater number may be accommodated by suitable changes in the transmission and other mechanisms as will be apparent to those skilled in the art in the light of the ensuing description.

In the particular machine illustrated, the keyboard is adjustable to any one of the eight distinct positions in each of which its columns of keys will be in longitudinal registry with a corresponding number of ports 5 in the upper part of the case, there being sixteen such ports.

Suitable dials, visible through certain of the ports 5, constantly display through such ports any number set up on the keyboard by the depression of particular keys thereof.

A second row of ports 6 in the upper part of the case corresponds in number to the possible operative positions of the keyboard, there being eight such ports in the particular machine disclosed. In any position to the right of that shown in Fig. 1 of the keyboard the first (or right hand) column of keys will register with one of the ports 6. The ports 6 expose dials each of which respectively displays the proper digit of the "operating number" for the particular setting of the keyboard in which its first (or right hand) column registers with the port in question. The operating number as referred to herein, is defined as designating the number of times that the keyboard set-up is rendered effective upon the answer registering dials. The dials exposed through ports 6 may be cleared by means of the lever 8.

The ports 7 display the numbers carried by the answer registering dials. There are sixteen such dials and sixteen ports in the particular machine illustrated. These dials may be cleared by means of the lever 9.

The keyboard is adjusted to its consecutive positions by manipulation of a hand wheel 10 at the front of the machine. In any position of the keyboard a particular column may be cleared by depressing the key 11 in registry with such column. If it is desired to clear the entire keyboard, the master clearance key 12 is depressed. The clearing of the keyboard, or any column thereof, automatically clears the corresponding dial or dials visible through ports 5 which at all times display the figure actually set up in the keyboard.

The several operations of which the machine is capable, are controlled by a series of buttons 13 at the left hand side of the face plate 2 which are designated respectively for addition, subtraction, multiplication and division. Each of these keys when depressed, sets the machine for the performance of the designated function.

The mechanism housed within case 1 includes the carriage 3 already mentioned, a power input which in the present machine preferably comprises a chain 15 arranged with finger grips 16 for manual operation to an exactly predetermined extent, a power shaft 17 connected to receive motion from the chain 15, and a transmission mechanism which is one of the most important features of the present machine and comprises means for transmitting to or from the answer registering dials exposed through port 7 a number which is the function not only of the number set up in the keyboard but also of the extent of operation of the prime mover or chain 15.

In addition to these principal features, there are numerous subordinate mechanisms for enabling the machine to perform its major functions. The structure of the various sub-assemblies will now be described in detail.

*The carriage.*—The carriage 3 comprises a suitable frame transversely slidable within the case upon suitable ways which, for the purpose of the present disclosure, may comprise supporting bars 18, (Figure 3), upon which operate rollers 19 carried by brackets 20 upon which the carriage is mounted. The brackets 20 are also provided with sleeves 21 through which extend guide rods 22 which position the carriage for rectilinear movement upon supports 18.

At its front, the carriage is provided with a rack 24 with which meshes a pinion 25 operated by a gear 26 on the shaft 27 which carries the hand wheel 10. The rotatable parts are journaled in a suitable support 28 provided within the front of casing 1 and the various operative positions of the carriage are defined by means of a resiliently yieldable stop or detent mechanism 55 which may consist of a spring pressed plunger 29 provided with anti-friction means, co-acting with a peripherally notched disk 30 carried by the shaft 27 upon which the hand wheel 10 is mounted. Such an arrangement is well known for the purpose of defining impositively the desired predetermined positions of the parts. In this instance, however, the plunger functions also as an interlock, as will hereinafter be described. Preferably the ratio of gear 26 to pinion 25 will be so chosen that the hand wheel 10 will turn 90° in adjusting the carriage between any two successive positions. In such case the detent disk 30 will be provided with notches at ninety degree intervals in its periphery.

*The keyboard.*—The frame comprising the carriage is conveniently divided by a partition 35 into an upper or keyboard chamber 36 and a lower chamber 37 in which a part of the transmission mechanism is housed. The various keys 4, arranged in columns having nine keys to the column, are vertically reciprocable with their respective stems 40 through the slots 41 in the top plate 2 of the machine and through suitable guide openings in the plates 42 and 35 which comprise the walls of chamber 36 of the carriage. Each of the stems or standards 40 for the keys 4 is of substantial width, as clearly shown in Figure 1 and Figure 8. Each key is normally supported in its uppermost position by an individual leaf spring 43 which may conveniently be anchored to the partition plate 35 and may be provided with a notched extremity interacting with lateral notches in the sides of the corresponding key stem 40, as clearly shown in Figure 8.

Each of the keys carries a cam projection 45 which not only defines the limit of upward movement of its respective key by contacting the upper wall of the carriage, as clearly shown in Figure 3, but is also adapted for interaction with an interlock plate which will now be described.

The interlock plates 47 are provided in number corresponding to the number of columns in the keyboard, there being one interlock plate associated with all of the keys of each particular column. The plates 47 are journaled in the front and rear walls 48 and 49 of the carriage and are normally pressed toward the front of the machine by the leaf springs 50. When a key is depressed, its cam projection 45 passes through apertures 52 in the plate 47 which are so disposed that in passing therethrough the cam projection 45 necessarily adjusts such plate 47 rearwardly against spring 50. When the key is fully depressed its cam projection will clear the under surface of plate 47 which will thereupon be returned by the spring to its original position, in which it will overlie the cam projection 45 and hold the key down.

If a mistake has been made it is only necessary to depress the proper key in the same column, whereby the cam projection 45 of the key last depressed will always produce a sufficient rearward movement of the detent plate 47 to release the key first depressed, thereby permitting the spring 43 of the released key to restore such key to its normal position. The pressure of the operator's finger on the key last depressed allows the interlock plate 47 to spring back again in time to detain such last depressed key in its lowered position. It is possible, therefore, to change the set-up in any particular column in the usual way by merely depressing the proper key in such column whereupon any key previously depressed will be released without necessity for a separate clearing operation.

*Keyboard clearing mechanism—Manual clearing.*—The keyboard or any column thereof may be cleared either manually or (in addition or subtraction) automatically. In each position of the keyboard there is a clearing key 11 aligned with each column of keys of the keyboard, as previously explained. The clearing keys 11 for individual columns are loosely mounted upon a common supporting shaft 55. Each key is provided with an arm adapted upon the clockwise (as viewed in Figures 7 and 9) oscillation of the respective clearance key 11 to engage the end of the corresponding interlock plate 47 to thrust such plate rearwardly, thereby releasing the interaction of plate 47 over the cam projection 45 of the depressed key and allowing it to rise to its ineffective position. When the individual clearing key 11 is released, the spring 50 will force the plate 47 forward and the released key will spring upwardly.

The master clearance key 12 is pinned to the rock shaft 55, as shown in Figure 9 and provided with a set of arms 56 corresponding in number to the columns to be cleared, in all positions of the keyboard. The arms 56 lie immediately adjacent the several individual clearing keys 11 so that in the depression of the master key 12, the resulting oscillation of rock shaft 55 will operate arms 56 to actuate all of the plates 47 simultaneously to key-releasing positions whereby to clear all columns in the manner above described.

*Mechanical clearing.*—The interlock plates for the respective columns are sufficiently wide so that they may be acted upon not only by the individual clearance keys 11 and the master clearing arms 56, but also by the mechanically functioning clearance cams 59 and 60 which are normally disposed out of alignment with the respective sets of plates, as clearly shown in Figures 6 and 7. Each such cam is provided with a spiral peripheral margin of gradually increasing radius for approximately 345°, the terminal portions of the spiral surface being joined in an abrupt shoulder. In cam 59 its spiral peripheral margin develops in a counter-clockwise direction as viewed in Figure 9 while in cam 60 the spiral margin develops in a clockwise direction as viewed in Figure 9.

Cams 59 and 60 are splined to a flattened shaft 62 upon which they are axially adjustable by means of shifting forks 63 and 64 for cams 60, and 59. The several shifting forks for corresponding cams are all mounted upon common rods 65 and 66 respectively, such rods being under the control of the addition and subtraction keys 13a and 13b at the left hand side of the machine. Each of the rods 65 and 66 has a laterally projecting pin 67 engaged in an obliquely disposed cam slot 68 in the shank of the respective key, as best shown in Figure 21. When such key is depressed, all of the several cams controlled thereby are shifted beyond and simultaneously in an axial direction upon the flattened operating shaft 62, whereby each such cam is brought into registry with the position which is or may be occupied by the interlock plates 47 in the several positions of the carriage. It will be obvious that upon rotation of shaft 62 through means hereinafter to be described, the cam 59 may be made effective through manipulation of key 13b and the proper direction of rotation of shaft 62 to clear simultaneously all columns of the keyboard. Likewise if key 13a is depressed and shaft 62 is operated in the opposite direction of rotation, the cams 60 will be effective to co-act with the interlock plate 47 of the respective columns to clear simultaneously all columns of the keyboard.

The means thus far described for clearing the keyboard include a means for utilizing keys 11 to clear individual columns of the keyboard which are in registry therewith, a means of utilizing the master clearance key 12 whereby to clear all columns of the keyboard in any positions thereof; and a means for mechanically clearing the keyboard in addition and subtraction through the rotation of shaft 62 in either direction and the preliminary adjustment of one of the two oppositely convoluted cams on such shaft into position for co-action with the column interlock plates of the keyboard to clear simultaneously all columns of the keyboard in any position thereof.

*Transmission mechanism.*—By the term "transmission mechanism" I intend to designate all those parts by which the transmission of motion to the various dials of the machine is accomplished or controlled.

In the case of the dials 75, of which there are eight which are directly connected to register through ports 5 the set-up on the keyboard at any given time, the transmission mechanism is very simple consisting merely in a lever 70 for each column of keys. Each lever 70 is pivoted upon a rod or pivot shaft 71 of the front of the carriage and its free end is connected by means of a tension strap or wire 72 to a drum 73 on the side of a corresponding dial 75. A torsion spring at 74 maintains the dial normally in a position to expose the figure zero on its periphery and at the same time supports lever 70 in its elevated position immediately beneath the stem portions 40 of the keys 4.

The upper margin of lever 70 exposed to the stems of the keys is given a predetermined contour such that the depression of any individual key of the series will produce the requisite effect on dial 75 bearing in mind the distance of the key from the pivot point 71 of lever 70. The lever contour as illustrated in Figure 3 will be found to be approximately correct so that each of the keys 4 which may be manipulated to depress lever 70 will cause a corresponding digit to appear on dial 75.

I shall now describe the very important mechanism by which a number set up on the keyboard and appearing in the several dials 75, or a function of such number, may be made to appear on the answer dials 84.

As will be noted from inspection of Figure 8 each of the stems 40 of keys 4 is comparatively wide. In the path of movement of these stems, five levers are provided for each column of keys, including lever 70 already described. In addition to levers 70 which have the sole function of operating dials 75 to show the set up on the keyboard, I also provide levers 76, 77, 78 and 79, as shown in Figures 3, 8 and 14. These levers, pivoted at 80, are directly concerned with the calculating functions of the machine.

Each of the levers has tabs which alone are within the range of movement of the keys and which consequently determine the effect of the several keys. Lever 76 is relatively short and is provided with four tabs 81 disposed respectively beneath those keys of the keyboard which bear digits 9, 8, 7 and 6, respectively.

Lever 77 is somewhat longer and is provided with tabs disposed respectively beneath the keys bearing digits 9 to 3 inclusive of each column.

Lever 78 is still longer but has fewer tabs which are located respectively beneath the keys bearing digits 9, 8, 5 and 2.

Lever 79 is the longest of the four levers and has tabs disposed respectively beneath the keys bearing digits 9, 7, 4 and 1. The several levers are separately illustrated in Figure 14.

It will be noted that each of the various levers 76 to 79 carries one or more small pinions at its free end whereby such pinions will be elevated whenever a key is depressed into contact with one of the tabs of the levers of this set. Lever 79 carries one such pinion, lever 78 carries two, and levers 76 and 77 carry three pinions each. In order that standard pinions may be used it has been found necessary to offset or stagger them where a plurality of pinions are carried by one lever. See Figures 15, 16, and 17 showing details of the disposition of the pinions in the end of one of these levers.

It will be understood that the levers 76 to 79 and the several pinions carried thereby are all mounted for movement with carriage 3 in the translation of the keyboard. Beneath the raised portion 82 of the housing 2 of the machine is a shaft 17 motivated by means hereinafter to be described. Disposed upon this shaft at intervals corresponding to the number and spacing of dials 75 are sets of gears, each set including two gears 86 spaced for registry and potential mesh with the staggered pinions carried by the lever set 76—79. Shaft 17 is freely rotatable within gears 86 and the gears are confined between wings 87 of the carriage for movement therewith longitudinally of shaft 17. Suitable friction detents such as that shown at 85' may be provided to maintain the gears 86 yieldably in the positions to which they have been adjusted by any operation of the machine.

It will be noted from Figure 3 that shaft 17 is flattened. Splined thereby to the shaft between each pair of gears 86 is a finger 89 which moves with the gears 86 along shaft 17 but which is connected to such shaft for rotation therewith. The extremities of the successive fingers 89 correspond to the teeth of gears 86 and are successively advanced at intervals of nine teeth about the peripheries of said gears. Consequently the finger-like teeth 89 are located equidistantly except that the distance between the tooth associated with the first column of the keyboard and the tooth associated with the last keyboard column is so determined that regardless of the direction of rotation of shaft 17, the movement of the teeth 89 through approximately 18 degrees of rotation past several teeth of the gears 86 can occur once in each rotation of shaft 17 without any resultant operation of any of the gears 86, whereby time will be afforded for the clearing of the keyboard by cams 59 and 60 during the mechanical clearing operation used in addition and subtraction.

As above indicated, the positions of the several single tooth fingers 89 are such that they will register with both rows of pinions 90 comprising the respective set carried by levers 76—79, the width of the fingers 89 being such as to overlap the staggered pinions of such levers for engagement with all such pinions.

The mechanism just described is such that the elevation of any pinion or pinions due to oscillation of the lever 76—79 carrying such pinion or pinions will cause each pinion elevated to mesh with the gears 86 in the path of movement of a finger or tooth 89. The pinions are held in positions for accurate mesh with gears 86 by flat springs 88, as shown in Figure 17. It will be obvious that each single tooth 89, upon rotation past any given elevated pinion, will cause a one-tooth rotation of such pinion and, since the pinion must in this position be in mesh with gears 86, a corresponding one-tooth advance of gears 86 will result. The single passage of a tooth or finger 89, therefore, will produce rotation of gears 86 to the extent of a number of teeth corresponding exactly with the number of pinions in mesh with such gears.

Now the locations of tabs 81 on levers 76—79 are such that the depression of any given key 4 in the keyboard will cause a number of pinions to mesh with said gears 86 corresponding with the digit represented by the key. If, for example, the key most remote from the operator, the No. 9 key, is depressed, the result will be to actuate all of the levers 76—79, thereby raising all of the pinions 90 into mesh with gears 86. It will be found that there are exactly nine such pinions and consequently the depression of the No. 9 key, to raise nine pinions into mesh with gears 86, will, in the single passage of a tooth 89, result in a nine-tooth rotation of gears 86.

The depression of the number 8 key actuates levers 76—78, omitting lever 79 which carries a single pinion, with the result that eight pinions are meshed with gears 86 to produce an eight-tooth advance of such gears for each time the co-acting finger 89 traverses the set of pinions. It will be observed that for every key in each column the number of pinions meshing with gears 86 upon depression of the key corresponds exactly with the digit designation of the key depressed, and a like advance of gears 86, as measured by the teeth thereof, results in each traverse of the respective finger over such pinions.

There is one finger 89 for each column of keys in the keyboard. The number of teeth in gears 86 and the angular spacing between the successive fingers 89 is especially designed, as illustrated, for the 8 column keyboard shown. The angular spacing between the fingers is employed to permit the tens transfer mechanism to operate between successive dials as finger 89 of any column engages with a pinion. Thus in any single rotation of shaft 17, the gears of the first column in which any key is depressed will first be operated. This will be followed by the actuation successively of the gears of each successive column from right to left in which a key is depressed.

The normally retracted pinions permit free carriage movement and serve as coupling devices in any keyboard position to transmit to the large transmission gears a degree of motion which is not only dependent upon the number of rotations of shaft 17 but is also, in effect, dependent upon the variable coupling produced and controlled by manipulation of the keyboard and the meshing of a smaller or greater number of coupling pinions with the transmission gear.

In order to utilize mechanism for transmitting the numbers set up in each column of the keyboard into terms of advance of gears 86, it is only necessary to communicate movement from gears 86 to a suitable registering device. It will be remembered that the ports 7 are provided for the answers to problems in addition and multiplication. Through these ports are visible dials 84 fixed in the upper portion 82 of the case 2 of the machine, whereas the gears 86 to which a function of the keyboard set up is transferred in terms of rotation are movable with the keyboard. It is necessary, therefore, to provide some motion transmitting connection which will enable each gear pair 86 to operate any dial 84 with which it may be in registry in the various keyboard positions.

To accomplish this result, I provide a single tooth pinion 96 carried by wings 87 of the carriage in a normally retracted position in which the gear appears in Figure 3 but adapted in the course of its rotation to swing through an arc whereby it will pass through mesh with pinion 91 meshing with dial driving gear 92 for the advance of the dial by one digit.

In order that the pinion 96 may have sufficient clearance beyond the teeth of the gears 86 it may be connected to such gears by a train including a pinion 93, gear 94, and pinion 95. The arrangement is such that in any position of rest of gears 86 the train 93—94—95 will maintain the single toothed pinion 96 in the retracted position shown to permit carriage movement.

Pinions 93 are mounted in pairs upon a shaft 93' and are spaced on said shaft to mesh with the gears 86 from which the pinions derive their motion. This shaft also carries the gear 94 which meshes with pinion 95 in the above train, as shown in Figure 22.

In order that the one tooth pinion 96 may be maintained in a retracted position as above described, the ratios of gear teeth are so chosen that each unit advance of the operating chain 15 will invariably leave the pinion in the position in which it has initially been fixed and which is such as not to impede free movement of the carriage. For example, pinions 93, as illustrated in Figure 3, have four teeth and gear 94 has 24 teeth. Thus each single tooth advance of gears 86 will cause gears 93 and gear 94 to rotate one fourth of a revolution. This will represent six teeth of gear 94. Gear 95, which is driven by gear 94, has just six teeth, so that the single tooth pinion 96 will make exactly one revolution for each tooth of advance of the gears 86. The locking device of Figure 10 makes it impossible, in the normal operation of the machine, to make less than a single tooth movement of gears 86. Hence, if pinion 96 is originally adjusted to a position where it will not interfere with the carriage, it must always be in that position whenever the carriage is moved.

Whenever the shaft 17 is in rotation, however, and the teeth 89 are traversing pinions 90 to communicate movement to gear set 86 and thence through train 93—94—95 to pinion 96, such pinion will in its rotation mesh with gear 91 and advance dial 84 one digit for every tooth rotation of the gear set 86. In referring to the gear set 86, it will be understood, of course, that pinion 93 meshes with both of the gears 86 to receive motion from either according to which of the staggered coupling pinions 90 is being acted upon at the moment by one of the teeth 89.

The usual tens transfer mechanism is provided between the dials 84 of the series. It has not been thought necessary to show this tens transfer mechanism nor to describe it in detail since it may correspond identically with any of the numerous tens transfer devices in common use in all kinds of calculating and adding machines and registers. Preferably, however, the tens-transfer takes place through gears 91.

I have now described the transmission mechanism whereby any number set up in a given column of a keyboard may, during rotation of the power shaft 17, be selectively translated into terms of rotative movement of the gear set 86 to register such number or any multiple or dividend thereof in dials 84 to the extent of the rotation shaft 17 and fingers 89. If a tooth 89 traverses pinions 90, just once, the number registered on dial 84 must correspond identically with the number set up in the particular column of the keyboard under consideration. For each successive time that any tooth 89 traverses the pinion set, the digit set up in the keyboard column will again be added to the total shown on dial 84 or, if the direction of rotation of shaft 17 is counterclockwise, as viewed in Figure 3, the number set up on the keyboard will be subtracted from the total shown on dials 84 and such subtraction will occur once for each traverse.

While I have described levers 76, 77, 78 and 79 as having three, three, two and one teeth, respectively, it will be obvious that by re-arranging the tabs 81 it would be possible to use five, three, one, and one teeth on the respective levers to obtain all combinations necessary to make up the digits from one to nine. Also teeth numbering four, three, two, and one could be used.

While I have limited my description to visible dials, it will be obvious that registering dials provided with type and ribbon and acting on a paper tape in the usual way may be added, if desired.

*Operating mechanism.*—Having now described the keyboard with its controls and the means for setting up in the dials numbers which in the case of dials 75 are exactly indicative of the keyboard set up and which, in the case of dials 84, are functions of such set up, I shall now describe the means which not only furnishes power for the operation of the transmission mechanism but which also determine the numerical extent to which the addition or subtraction of the keyboard set up from the number shown on the answer dials 84 is repeated.

I have already indicated that the prime mover for the machine consists of a chain 15 having finger lugs 16. The chain and lugs appear clearly in Figs. 1 and 2. The sprockets 100 and 101 over which the chain operates are best illustrated in Figure 4. It is particularly to be noted from an inspection of Figs. 1 and 2 that each of the lugs 16 on chain 15 is directly opposite one of the keys of the keyboard. It will be noted that there are exactly nine such lugs exposed on the outside of the case at any given time. Toward the operator the next lug adjacent those exposed disappears within the case about sprocket 100. In the part of the chain remote from the operator the next lug adjacent those exposed is concealed by the upper portion 82 of the case 2.

The arrangement above described is organized to facilitate manipulation of the chain to an exactly predetermined extent. The motion of the chain is communicated to power shaft 17 through a gear 102 connected with sprocket 101, an intermediate gear 103, and a driven gear 104 on shaft 17. The disk 105, carried by shaft 17, has its periphery notched or recessed at 106 to receive the end of spring pressed plunger 107 which provides an impositive detent for defining selected positions of the chain and shaft 17. Any other impositive detent may be employed. The gear ratios illustrated are so chosen that the detent device 107 will give a tangible indication of position once during each movement of chain 15 for a distance corresponding to the space between lugs 16 thereof. This distance also corresponds to a complete rotation of shaft 17 as required to cause each of the fingers or teeth 89 to traverse its respective set of coupling pinions 90.

Thus, if the operator places a finger upon the fifth of the exposed lugs 16 of chain 15, such lug being directly opposite the number 5 keys of the keyboard, and draws the chain toward him until the lug engaged by his finger disappears within case 2, the chain will have made a five-step advance indicated by five successive tangible clicks of the detent device 107 and resulting in five successive traverses by the respective fingers or mutilated gear teeth 89 of all pinions 90 elevated to coupling position.

It must be obvious that this mechanism provides a means of multiplying by nine, or by any digit less than nine, any number set up in the keys 4 of the keyboard. The number of times the keyboard set up will be added or deducted in the answer dials 84 will depend upon the number of times that a finger or tooth 89 traverses, in a clockwise or counter-clockwise direction, the coupling pinions 90. The number of teeth 89 which traverse the coupling pinions is directly dependent upon the number of units of movement of chain 15. There are but nine lugs of the chain exposed at any time and consequently the number of traverses may not exceed nine for any single upward or downward movement.

If, as will usually be done, the chain 15 is engaged by the finger of the operator at the lug properly indicative of the units of advance required, it will only be necessary for the operator to draw the chain toward him as far as possible (that is to say, until the lug engaged by his finger drops within the case, as shown in Figure 4) to produce the required numbers of traverses of set-up pinions 90 by teeth or fingers 89. Since it is only necessary to engage the chain at the proper point and to pull it to its limit of movement in order to get the desired result, the operator is relieved of the necessity of consciously limiting the chain to a predetermined movement and the operation of the machine becomes semi-automatic.

Means is provided, however, for directly indicating the extent of chain movement in order to preserve a visible indication of the multiplier or divisor as the case may be. (It will be understood, of course, that in dividing the chain will be pushed from the operator instead of pulled toward him.) For visual indication of the movement of chain 15, I have provided a four tooth pinion at 108 meshing directly with the seventy-two tooth gear 102 to make two rotations each time the chain moves one step. A double cam 160, coupled with gear 108, oscillates cam follower lever 161 four times during each single step advance of the chain in either direction. Pawl 162, carried by lever 161, actuates the twelve tooth rachet 163 so that it makes a one third rotation in a clockwise direction as viewed in Figure 4 for each single step advance of the chain. This ratchet is mounted on a shaft 109 extending transversely of the case and flattened or otherwise adapted for the splined engagement of a three tooth pinion 110 therewith. There is but one such pinion 110 and this is located at the right hand side of the carriage adjacent one of the carriage wings 87. In each of the carriage positions it will register with that dial 115 visible through the ports 6 in line with the first column of keys.

Each single step movement of chain 15 and each corresponding rotation of shaft 17, will result in a one third rotation of the pinion 110 with a corresponding one-tooth advance of gear 116 engaged by such pinion and meshing with gear 117 to which the dial 115 is connected. Since there is one dial 115 for each position of the keyboard and since each such dial in turn, in the successive keyboard positions, will be engaged by the pinion 110, it will be obvious that after a multiplying or dividing operation the dials 115 will register the number of units of advance of the chain 15 in the corresponding position of the keyboard. The combined reading of dials 115 will therefore give the operating number which, in the case of division, will be the quotient or answer but which, in the case of multiplication, will be the multiplier, and in the case of addition or subtraction will be "one".

The purpose of the cam 160, lever 161, pawl 162 and ratchet 163 is to operate the dials in a positive direction from "one" to "ten" to indicate the correct number of units of movement of the chain irrespective of the direction of such movement.

The cams 59 and 60 which are used in addition and subtraction to clear the keyboard automatically after a single step advance in either direction of chain 15 have already been described and reference has been made to the shaft 62 upon which such cams are mounted for axial adjustment into registry with latch plates 47 of the respective columns of keys. It will be remembered that when the key 13a at the left hand side of the machine designated for addition is depressed, the result is a movement of rod 65 which shifts all of the several cams 60 into registry with their respective column key latch plates 47, whereas the depression of key 13b setting the machine for subtraction, removes cams 60 from their operative position and registers cams 59 with the several latch plates 47. I shall now describe the mechanism by which motion is transmitted to the shaft 62 upon which these cams are mounted.

As shown in Figs. 4 and 7, the sprocket 100 about which the end of chain 15 nearest the operator is guided, is provided with a gear 118 which meshes with a smaller gear 119 fast on shaft 62. These gears have the same ratio as gears 102 and 108 so that each step of movement of chain 15 in either direction will produce one complete rotation of shaft 62 and the cams carried thereby. Thus in addition or subtraction, regardless of the distance to which chain 15 may be adjusted, the first step or movement of such chain will automatically clear the board and prevent the possibility of adding or subtracting the set-up in the keyboard more than once to or from the amount shown on the answer dials 84.

*Dial clearing mechanism.*—It will be understood that the dials 75, visible through ports 5, indicate at all times the condition of the keyboard, and are self-clearing whenever the keyboard is cleared. It is necessary, after most machine operations, however, to clear the dials 115 and 84. Special mechanism is provided for this purpose. Since the arrangement as to dials 84 is similar to the arrangement for clearing dials 115, it is only necessary to describe one mechanism in order to enable the clearing devices to be understood.

The dials 84 are free upon a transversely extending shaft 120 which is mounted in the case for both axial and rotative movement. The dials are spaced from each other at intervals determined by the spacing tubes 121.

Each of the spacing tubes 121 is slotted at 122 and through their respective slots project pins 123 carried by the shaft 120 and adapted, when such shaft is adjusted to the right as viewed in Figure 18, to register with pins 124, carried by the several dials and from which pins 123 are normally out of registry. It will be obvious that when shaft 120 is first pushed to the right as viewed in Figure 18 and is then turned for full 360° rotations in clockwise or counter-clockwise directions, the several pins 123 will, in the course of such rotations, somewhere pick up pins 124 of any dial which has moved from its original position and will rotate each such displaced dial back to its predetermined or original position in which the figure zero, carried thereon, will be displayed through its respective port 7.

The means by which shaft 120 is axially adjusted and rotated for a full 360° movement by a single manual operation, will now be described.

The hand lever 9, shown at the left hand side of the upper portion 82 of the machine casing, is connected with a cam segment device 125 normally maintained in a retracted position by a tension spring 126. The end of shaft 120 carries a cam follower 130 in the form of a disk and projecting axially from the face of the disk the shaft is provided with a three-toothed pinion 131. The beveled cam surface 132 of the cam segment 125 normally lies immediately adjacent the end of the cam follower disk 130, the disk and shaft 120 being held in the extreme left hand position of such shaft (as viewed in Figure 18) by a leaf spring 134.

When the hand lever 9 is depressed to oscillate the cam segment 125 about its fulcrum at 135, the first result of the oscillatory movement is the axial adjustment of shaft 120 to the right under pressure of the beveled cam surface 132 of cam segment 125 against the cam follower disk 130. As soon as the shaft reaches its ultimate position of adjustment to bring its several pins 123 into registry with the dial pins 124, the three teeth 137 of segment 125 mesh with the teeth of pinion 131 to produce a single rotation of such pinion and shaft 120 with the result that all displaced dials are restored to their predetermined positions of zero indication upon the release of lever 9 which now permits both the cam segment and the shaft 120 to be restored to their original relative positions leaving the dials in their zero position and free for the performance of their registering and tens transfer functions as above described.

Lever 8 controls dials 115 through mechanism corresponding in all particulars to that above described and hence designated by corresponding reference characters.

*Automatic stop for division.*—Those skilled in the art and familiar with the practice of mechanical division will appreciate the necessity for a stop which will automatically advise the operator when, in each single dividing operation, the divisor has been subtracted from the dividend a sufficient number of times to equal the proper digit in the quotient. Each such dividing operation consists in effect in a repeated subtraction of the divisor from the dividend. If the subtracting operation is carried beyond a number of times corresponding to the proper quotient digit, the dividend will be exhausted and the tens transfer mechanism will function to turn up "nines" in all the successive dials of the machine to the left of the column of the divisor.

In order to advise the operator that the proper quotient has been passed in any given dividing operation, I provide the mechanism now to be described.

In addition to those of dials 84 with which the gears 86 mounted in the carriage are adapted for registry, I provide at 84' an extra dial with which the carriage can never register and which operates only through the tens transfer mechanism (not shown) from the next preceding dial of the series and serves to register digits which would be beyond the capacity of the machine if the number of dials 84 corresponded exactly to the number of possible column positions of the keyboard.

Dial 84' carries a pinion 138 which, by means of the small pinion 139, is meshed with a gear 140 free to rotate on the end of shaft 17.

Through gear 140 (Figure 5) the movement of the final dial 84' of the series of dials 84, is communicated to a pinion 141 and notched disc 142 mounted idle on shaft 145. A detent lever 146 is provided with a lug 147 receivable into the notch of disc 142 and adapted when engaged therein, to restrain disc 142 against further movement.

Since it is not desired that the detent should be operative during addition, subtraction, or multiplication, means is provided for normally holding the detent in its retracted or inoperative position against tension spring 148. This means may conveniently consist of push rod 149 normally held by spring 150 in the retracted position in which it is illustrated in Figure 5, but adapted upon depression of the division key 13d to be forced, by the interaction of cam 151 with its end, toward the left. This movement of push rod 149 releases lever 146 for oscillation when oscillation is permitted to the detent lever by registry of its lug 147 with the peripheral notch of disc 142. The position of the notch in the periphery of the disc is so chosen that it will be presented to lug 147 of the detent lever only in a position corresponding to that position of dial 84' in which the figure 9 is exposed thereon.

The above described mechanism would in itself be sufficient to check the machine and thus give notice to the operator of the fact that, during division, the machine had overrun. It will be noted, however, that in so doing, delicate parts such as the transfer and dial mechanisms would be subjected to the load of suddenly checking the operation of the machine upon engagement of the lug 147 of the peripheral notch of disc 142. In order to relieve these parts of such an extreme load, I have provided an auxiliary driving connection directly from the source of power (chain 15 in this exemplification of the invention) and designed to carry any load to which the sudden checking of the machine may subject the parts. The disc 142 therefore becomes merely a control device which is not in itself subject to load. To bring about this result, I employ the following mechanism.

Reference has already been made to the friction springs 85' which move with the wings 87 of the carriage and are maintained in registry with the gears 86 to fix their respective positions. These springs 85' are conveniently supported upon the power transmitting shaft 145 which carries pinion 141 and disc 142. Immediately adjacent disc 142 (Figure 11) is another disc 152 which, instead of one notch, has a number of notches 153 in its periphery corresponding to each step of movement of chain 15.

Thus, regardless of the position of chain 15, whenever the lug 147 drops into the notch of disc 142 it will also engage in one of the notches of disc 152. Disc 152 is fast on shaft 145 and said shaft is geared by means of gears 155 and 156 to shaft 17 which in turn is geared as aforesaid to sprocket 101 over which chain 115 operates. Because of this arrangement it will be obvious that when the control disc 142 permits the detent lever 146 to become effective, such detent will engage directly with the power driven shaft 145, and will thereby act immediately upon the source of power for the calculating machine instead of requiring the checking movement to be effective through such delicate motion transmitting trains as those commonly used in tens transfer devices.

Although the mechanism above described will automatically give a correct answer to addition, subtraction and multiplication, it will only give a correct answer automatically in division if there is no remainder or if, through the careful manipulation of the operator, the machine is so manipulated that an overdraft is prevented. If the overdraft occurs so that the motion of the machine is checked by the automatic stop mechanism above described, the quotient register, at the time the parts come to rest, will read one unit too high in the particular order in which the operation was performed. Correction of the overdraft, by clearing an entry of the remainder in the accumulator or register 84, will cause another unit to be added to the quotient register 115 for the reason that this register always operates in a positive direction regardless of whether the source of power or chain be operated forwardly or backwardly. The result will be that the quotient in the particular order in which the division operation is being performed, will be two units too high in the particular apparatus shown. Mechanism for ensuring automatically a correct quotient reading is, however, known to the art.

In this way I also avoid the excessive lost motion which would inevitably be present if the checking device could only function through a series of tens transfer devices.

Figure 10:
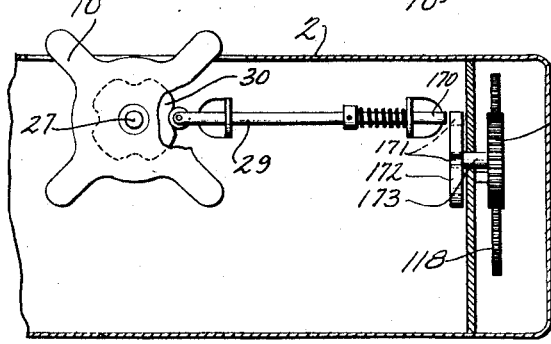
Figure 10 (Sheet 2) is a view in section transversely through the front of the casing exposing in front elevation the carriage adjuster and interlock.

*Interlock.*—In order to prevent errors by inexperienced operators, it is desirable to prevent movement of the carriage at any intermediate point in the operation of the actuating chain and, conversely, to prevent movement of the operating chain at any intermediate point of adjustment of the carriage. In order to accomplish these results I have provided an interlock mechanism in simple form as shown in Figure 10.

The detent plunger 29 previously referred to as defining the several operative positions of the sprocket 10 which controls the adjustment of the carriage, preferably takes the form of a rod suitably guided for reciprocation and receivable at its end 170 in any one of a plurality of notches 171 in a disk 172 carried by a shaft 173 driven by gear 174 which meshes with gear 118 previously described.

The extremity of rod 170, when engaged in any notch 171, serves as a key to secure disk 172 and its associated parts from rotation, thus preventing movement of the chain. This condition occurs whenever the notched disk 30 is adjusted to an intermediate point so as to actuate the rod or plunger 29 to the right as viewed in Figure 10.

Conversely, if the chain is brought to rest at any intermediate point, the openings 171 in disk 172 will not register with the end 170 of the rod or plunger 29 and such rod will be unable to move to the right, thus holding the hand wheel 10 from rotation and anchoring the carriage against movement.

I claim:

1. In a calculator, the combination with a register including a set of registering mechanisms, of a driven set of motion receiving parts, a motion delivering part associated with each motion receiving part, a source of operating motion operatively connected with the motion delivery parts, coupling devices adapted for engagement with said motion delivering and motion receiving parts, and means on said carriage for the controlled manipulation of said coupling devices for the transmission of movement between the motion delivering part and motion receiving part, said coupling devices each comprising a plurality of gear means selectively engageable between said parts and productive of different degrees of motion delivery between said parts in a predetermined movement of the motion delivering part according to the total number of teeth of the several gear means so engaged, said carriage being provided with keys constituting a part of the aforesaid means for controlled coupling manipulation and operatively connected respectively for the manipulation of particular gear means and combinations of gear means to produce a predetermined sequence of steps of advance in the motion receiving part according to the key manipulated.

2. In a calculator, the combination with a registering mechanism including a driven gear, of a mutilated driving gear co-axial with the driven gear, and a plurality of coupling pinions selectively adapted for mesh with both gears at angular intervals exceeding the arcuate extent of the mutilated gear, whereby the motion transmitting effect of the pinions between said gears will be cumulated.

3. In a calculator, the combination with a register and driven gear means connected therewith, of a set of driving pinions for said driven gear, an actuator for said pinions, and key controlled means for selectively coupling said pinions with said actuator successively, whereby to impart predetermined movement to selected pinions with cumulative effect upon said register.

4. In a calculator, the combination with registering mechanism including a driven gear means, of a column of keys, a set of pinions corresponding in number to the keys of the column, means associated with each key of the column adapted upon manipulation of such key for rendering effective upon said driven gear means a number of pinions corresponding to the value of the particular key in the column, and a driving means arranged to act successively upon such pinions as are effective upon said driven gear means, whereby to operate said driven gear means to an extent corresponding to the value of the key manipulated.

5. In a calculator, the combination with a register device including a plurality of digit registers each including driven gear means, of a keyboard shiftable with respect to said registers and provided with a column of independently manipulated keys, a movable part comprising a source of operating motion associated with the driven gear means of each register, normally retracted toothed devices mounted for translation with said keyboard and adapted in selected keyboard positions for interaction with the part and driven gear means of a particular register aligned therewith for the control of motion transmission therebetween, said devices corresponding in number to the keys of said column and being determinative in any given movement of said part of the extent of corresponding movement of the register in accordance with the number of such devices effective, and motion transmitting connections from the several keys of said column to the several devices aforesaid, said connections being adapted to render said devices effective upon manipulation of a key of said column to a number corresponding to the digit designation of such key in its column, whereby the keys of said column may be used to control the extent of actuation of a register with which such column is aligned.

6. In a calculator, the combination with a plurality of register dials presenting driven gear means in corresponding positions along a predetermined path, driving means associated with each of said driven gear means and connected with a common source of operating motion, a keyboard reciprocable to a plurality of positions along said path, a column of keys on said keyboard, normally retracted pinions corresponding in number to said keys and mounted for translative movement with said keyboard, said pinions being adapted in each of a plurality of positions of said keyboard to mesh with driven gear means of register dials aligned therewith in such positions, motion transmitting connections extending from said keys to said pinions and adapted to project said pinions to mesh with said gear means aligned therewith in a number corresponding to the digit designation of the key manipulated, said driving means being adapted to interact successively with the pinions meshing with said gear means to produce on said dial a movement which is a function of the digit designation of the key manipulated.

7. In a calculator, the combination with a register provided with driven gear means, of a driving multilated gear associated with said driven gear means, a set of normally retracted pinions adapted for mesh with said driving gear and driven gear means at points arcuately spaced for a distance equivalent to the arcuate extent of said mutilated gear, whereby said pinions may be acted upon successively by said gear, a column of keys having digit designations, and supports for said pinions provided with actuating connections associated with said keys and adapted to receive motion from selected keys in a direction to mesh the respective pinions with said gear means, certain of said keys being adapted to impart motion to individual pinion supports and others of said keys being adapted to transmit motion simultaneously to a plurality of pinion supports, said connections being arranged to actuate from each key a number of pinions corresponding to the digit designation of the key whereby the effect on the register of the movement of said part will be a function of the designation of such key.

8. In a calculator, the combination with a register and means for transmitting movement thereto including driving and driven parts, of toothed motion delivery controls normally retracted and adapted for selective advance to operative motion transmitting relation to said parts, said controls being mounted singly and in multiples upon suitable supports arranged for the adjustment of said controls to active position in numbers which singly and in combination may equal every consecutive digit from one to nine, a column of nine keys and operative connections from respective keys to the supports for said controls operatively organized for the manipulation to active position by any given key of a number of such controls corresponding to the digit designation to the key in the column whereby the motion delivered from the driving to the driven part will be a function of such digit designation.

9. In a calculator, the combination with driving and driven gear means, of a set of pinions numbering not less than nine normally retracted and adapted to be advanced for mesh simultaneously with said means, supports for said pinions movable for the advance and the retraction thereof, the disposition of such pinions on said supports being such that by the adjustment of individual supports and predetermined combinations of supports any number of pinions from one to nine can be meshed with said means, a column of not less than nine keys and motion transmitting connections from said keys to said supports including parts adapted for the selective engagement of particular supports by particular keys, said parts being so disposed as to actuate the proper support and combination of supports to mesh with said means a number of pinions corresponding to the digit designation of the key manipulated.

10. In a calculator, the combination with a register and driving and driven members adapted for controlled connection for motion transmission, of control parts numbering not less than nine mounted for movement between advanced and retracted positions, four supports for said parts adjustable to carry said parts from their ineffective retracted position to their effective advanced position, nine keys provided with actuating connections associated with the four supports and tabs on said supports in the path of movement of said connections, the connection of each key being adapted in the manipulation of each key to engage tabs on one or more supports carrying control parts to a total number equal to the digit designation of such key, and means whereby the transmission of motion from said driving to said driven member will be a function of the number of control parts advanced to effective position.

11. In a device of the character described, the combination with a register including a series of driven gears, of a driving mutilated gear associated with each driven gear, control pinions normally retracted and adapted for mesh simultaneously with driving and driven gears for the transmission of motion to said driven gears to an extent which is a function of the number of pinions traversed by the driving gear in each rotation thereof, keys controlling said pinions and adapted selectively to advance pinions to mesh with said gears in any number to provide unit advance of a given driven gear from one to nine in each given rotation of said driving gear, said pinions being spaced arcuately to an extent equivalent to the arcuate extent of their respective mutilated gear whereby the effect of said pinions on the driven gear is cumulated, and the mutilated gears associated with consecutive driven gears being angularly offset to an arcuate extent equal to the total arcuate extent of the pinion set associated with the preceding register.

12. In a device of the character described, the combination with a plurality of driven register gears, of a single toothed gear co-axially associated with each driven gear, said single toothed gears being successively angularly offset and interconnected for simultaneous rotation, and a set of key controlled pinions disposed for motion transmission between each driving and driven gear, the spacing between said pinions being at least one tooth and the angular offset of successive single toothed gears being at least equal to the arcuate extent of each set of pinions whereby the effect of the pinions of each set on their associated driven gear may be cumulative and the effect of sets of pinions on the series of driven gears may be successive.

13. In a device of the character described, the combination with a plurality of driven register gears and dials, of mutilated gears associated with the respective driven gears and interconnected for successive traverse of a given path paralleling the series of driven gears, a shiftable keyboard provided with columns of keys adapted for alignment with particular dials in different positions of the keyboard, and motion transmitting pinions subject to the control of particular keys and adapted for mesh when manipulated by a key, with the driven gear of the aligned register in a number equal to the digit designation of the key manipulated, the pinions manipulated by keys in successive columns being traversed successively by corresponding driving mutilated gears whereby the mesh of said pinions with the corresponding driven gears is adapted to produce upon said dials a cumulative effect which is a function of the digit designations of the keys manipulated in the several columns.

14. In a device of the character described, the combination with a series of driven register gears, of a driving means including spoke teeth associated with the individual driven gears and successively angularly offset, sets of pinions normally retracted and adapted for mesh with particular driven gears in the path of movement of the spoke tooth associated therewith, and key controlled means for advancing said pinions selectively to a position for such mesh in numbers optionally available from one to nine, the pinions of each set being consecutively arcuately displaced whereby the effect on the associated driven gear of the traverse of said pinions by a spoke tooth will be a function of the number of pinions meshing with said gear.

15. In a device of the character described, the combination with driven register gears, of a driving means including spoke teeth associated with the individual driven gears and successively angularly offset, sets of pinions normally retracted and adapted for mesh with particular driven gears in the path of movement of the spoke tooth associated therewith, and key controlled means for advancing said pinions selectively to a position for such mesh in numbers optionally available from one to nine, the pinions of each set being consecutively arcuately displaced whereby the effect on the associated driven gear of the traverse of said pinions by a spoke tooth will be a function of the number of pinions meshing with said gear, and the angular offset between the spoke teeth associated with consecutive driven gears in the series being as great as the arcuate extent of the set of pinions first traversed whereby to provide an interval between the operation of successive driven gears.

16. In a device of the character described, the combination with a series of driven register gears, of a driving means including spoke teeth associated with the individual driven gears and successively angularly offset, sets of pinions normally retracted and adapted for mesh with particular driven gears in the path of movement of the spoke tooth associated therewith, and key controlled means for advancing said pinions selectively to a position for such mesh in numbers optionally available from one to nine, a plurality of said pinions and key controlled means being mounted on a travelling carriage, said pinions being effective to control the transmission of motion to the several gears aligned therewith in the respective carriage positions to an extent in each case equal to a function of the number of pinions meshing with the individual driven gears.

17. In a device of the character described, the combination with a series of registers and driving connections therefor including shiftable driven register gears, of a shiftable carriage having columns of keys in a number less than the number of said registers and corresponding thereto in spacing whereby to be adapted for alignment with various registers in the several positions of the carriage, driving means including spoke teeth associated with the several driven gears and successively angularly offset, sets of pinions movable with said carriage in normally retracted position and adapted when advanced to mesh with consecutive driven gears in the path of movement of the associated spoke teeth whereby to transmit movement from such spoke teeth to said driven gears to an extent which is a function of the number of pinions meshing with the respective driven gears, the pinions of each set being successively arcuately advanced in the direction of movement of said spoke teeth whereby their effect is cumulative, movable supports for the advance of said pinions from their normally retracted position, and connections between said keys and particular supports adapted for each key of a given column to advance a support or combination of supports providing for mesh with the aligned driven gear, a number of pinions corresponding to the digit designation of the key manipulated in such column.

18. In a device of the character described, the combination with a plurality of driven register-operating gears, of driving means comprising angularly offset single tooth drivers associated with successive driven gears, a set of normally retracted pinions adapted when advanced for mesh with the driven gears in a position to be traversed by the associated single tooth of the driving means, movable supports for said pinions, the pinions beng arranged on the supports for advance in any number from one to nine for simultaneous mesh as aforesaid, and a column of nine keys provided with actuating connections for said supports including individual lugs adapted to actuate particular supports in combinations to advance pinions to a number corresponding to the digit designation of the particular key manipulated, said pinions being mounted in a normally retracted position and adapted to control the transmission of motion to any particular gear when meshed therewith by the manipulation of a key of said column.

19. In a device of the character described, the combination with a ported case having a slotted portion, of a shiftable keyboard including columns of keys adapted for individual manipulation irrespective of the position of the keyboard and adapted to traverse said slots in the course of keyboard movement, a driving means having a portion accessible outside of the case, dials, and means for transmitting motion from said driving means to said dials subject to the control of keys manipulated in a particular column aligned with a particular dial.

20. The combination with a set of register dials and a driving means, of a shiftable keyboard including columns of keys adapted in various keyboard positions for alignment with particular dials, means for the controlled transmission of motion from said driving means to dials aligned with columns of said keyboard, means whereby the manipulation of individual keys of the respective columns will be determinative of the effect produced on the aligned dials by a predetermined advance of said driving means, detent means for holding in its effective position a key manipulated in any column of said keyboard, together with a set of individual clearance keys so positioned as to be aligned with respective columns of the keyboard in the various keyboard positions, and means whereby each of said individual clearance keys is adapted to release the detent means of keys in the particular column with which it is aligned, said clearance keys being fixed with reference to the dials and provided with means acting upon the keys registering therewith in a given keyboard position.

21. In a calculator, the combination with a register and motion transmitting connections for the control of the transmission of movement to said register, of a column of keys each provided with means determinative of a given movement of said register in the course of a predetermined movement of said connections, and a driving means for said connections including circuitously movable manually engageable finger lugs and provided with means definitive of units of advance thereof, together with motion transmitting mechanism connecting said driving means with said connections to produce said predetermined movement of said connections in each unit advance of said driving means.

22. In a calculator, the combination with a register and motion transmitting connections for the control of the transmission of movement to said register, of a column of keys each provided with means determinative of a given movement of said register in the course of a predetermined movement of said connections, and a driving means for said connections including circuitously movable manually engageable finger lugs and provided with means definitive of units of advance thereof, together with motion transmitting mechanism connecting said driving means with said connections to produce said predetermined movement of said connections in each unit advance of said driving means, together with a housing for a portion of said driving means exposing at the end of each unit advance thereof only a number of lugs corresponding to the number of keys in said column and said lugs being positioned at the end of each unit of advance substantially in alignment with the keys of said column.

23. In a calculator, the combination with a register and means for controlling transmission of movement thereto including a column of spaced keys, of a source of operating motion comprising an endless driving means having spaced manually engageable lugs disposed adjacent the keys and coinciding in spacing thereto and means defining predetermined positions of said driving means in each of which the position of each of a number of lugs thereof will be substantially aligned with the positions of adjacent keys whereby lugs of said driving means will be identified with particular respective keys irrespective of the position of said driving means.

24. In a calculator, the combination with a column of keys and a register controlled as to operation by the respective keys of said column, of a driving means for said register comprising a chain provided at intervals throughout its extent with manually engageable lugs, the spacing of which corresponds substantially exactly to the spacing of the keys of the column, and means defining predetermined positions of said driving means in each of which any of the lugs thereof may be substantially directly in line with an adjacent key of said column.

25. In a device of the character described, the combination with a register having a driven member, a shaft carrying a driving member and a column of keys provided with means controlling the extent of transmission of movement from said driving member to said driven member in any given movement of said shaft, of a housing for said shaft, said members and said means, a chain actuator provided with manually engageable lugs, and guides supporting said actuator for movement partially within and partially outside of said housing, whereby a predetermined number of lugs are exposed at all times outside of the housing, and operative connections between said actuator and said shaft, the lugs of said actuator having a predetermined spacing with reference to the spacing of said keys whereby any given sequence of lugs on the actuator may bear like predetermined relations to the several keys of said column, and means defining positions of said actuator in which its respective lugs will occupy the predetermined relative positions aforesaid.

26. In a device of the character described, the combination with a set of driven register members and a driving shaft providing driving members associated respectively with each driven member, of a sprocket operatively connected with said shaft for the operation thereof, a housing for said members and said shaft, a chain operatively supported to traverse said sprocket and having a portion exposed exteriorly of the housing, manually engageable lugs equi-distantly spaced on said chain, a detent device defining steps of movement of said chain equal to the spacing between said lugs, and a column of keys each provided with means for providing a predetermined degree of coupling between said driving and driven members in each rotation of said shaft, the connection between said chain and said shaft being adapted to rotate said shaft once for each unit step of advance of said chain between successive operations of said detent device whereby the operation of the register will be a function of the degree of coupling provided by the key manipulated and of the number of units of advance of said chain, and means for limiting said chain to nine units of advance from any given starting point in one operation.

27. The combination with a series of driven register members correspondingly located upon a predetermined path, of a keyboard shiftable with respect to said members, a column of keys on said keyboard, coupling means carried by the keyboard along said path and adapted for interaction with the driven members when aligned therewith, a source of operating motion provided with connections adapted to transmit motion through said coupling means to the driven members, and control devices operatively arranged for actuation by the respective keys of the columns and connected with said coupling means to determine the extent of coupling between said connections and driven members in any given operation of said connections, said source of operating motion comprising an endless series of mutually interconnected manually engageable lugs mounted for circuitous movement and provided with motion transmitting mechanism driving said connections and adapted in one unit of advance from the position of one lug to the position of the next to exhaust the potential motion transmitting facilities of said coupling device, at least nine lugs being exposed for selective manual engagement in the operation of said source of power, whereby said source of power may be actuated any number of units up to nine in a single operation.

28. In a calculator, the combination with a register including a series of relatively non-translatable driven members, of a keyboard shiftable with respect to said register, keys on said keyboard arranged in columns spaced from adjacent columns in accordance with the spacing between said members whereby in various positions of the keyboard the columns of keys will be substantially aligned with particular members, a drive shaft, means controlled by the individual keys of the respective columns for transmitting motion from said drive shaft to the members with which columns are aligned, said means being adapted to proportion the amount of motion transmitted with reference to the digit designation of the key manipulated in each column, and an actuating device for said drive shaft comprising interconnected manually engageable lugs mounted for circuitous movement and operatively connected with the drive shaft, the spacing of said lugs corresponding to the spacing of keys in the respective columns, and a housing provided with slots for the movement of said keys with said keyboard and provided with means limiting the manual operation of said lugs to an extent not exceeding the space occupied by nine consecutive lugs in any given operation, said actuating device having connections to said drive shaft adapted to transmit sufficient motion thereto in each one-lug advance to exhaust the motion transmitting possibilities of said key controlled means.

29. In a calculator, the combination with a register and driving means therefor, of a set of keys, coupling devices controlled by the respective keys and adapted in a unit movement of said driving means to transmit motion to said register to a degree corresponding to the unit designation of the key manipulated, and a source of operating motion to which said driving means is operatively connected, said source of operating motion comprising an endless chain carrying a series of manually engageable lugs mounted for circuitous movement and provided with operative connections for actuating the driving means in a ratio such as to be adapted in moving the distance between two consecutive lugs to advance said driving means said unit distance, at least nine lugs being exposed for selective manual engagement in the operation of said chain, whereby said driving means may be actuated any number of units up to nine in a single operation.

30. In a multiplying or dividing machine including means for setting up a multiplicand, a register, and driven means for transferring the multiplicand to the register in each unit operation of the driven means, the combination of a driving device comprising an endless series of mutually interconnected and manually engageable lugs mounted for circuitous movement, stop means disposed upon the path of movement of said lugs and providing spaced stops with which the hand of the operator will engage upon movement of any lug for a distance not exceeding the space occupied by nine consecutive lugs, and motion transmitting connections from said device to said driven means for actuating said driven means through a unit operation upon each advance of said device for the space between two consecutive lugs.

FRANK A. KAISER.